(12) United States Patent
Powell et al.

(10) Patent No.: US 6,230,072 B1
(45) Date of Patent: May 8, 2001

(54) BOILER AUTOMATED WELDING SYSTEM (BAWS)

(76) Inventors: John W. Powell, 7638 Danks Dr., Evergreen, CO (US) 80439; Matthew J. Dvornak, 5661 S. Parfet St., Littleton, CO (US) 80127; Charles C. King, 96 DeFrance Way, Golden, CO (US) 80401

(*) Notice: Subject to any disclaimer, the term of this patent is extended or adjusted under 35 U.S.C. 154(b) by 0 days.

(21) Appl. No.: 09/020,923

(22) Filed: Feb. 9, 1998

(51) Int. Cl.[7] ....................................................... G06F 19/00

(52) U.S. Cl. ............................ 700/195; 700/186; 901/42

(58) Field of Search .................................... 700/186–195, 700/123, 207; 74/490.1, 89.18; 901/42, 29

(56) References Cited

U.S. PATENT DOCUMENTS

| | | | |
|---|---|---|---|
| 5,243,873 | * 9/1993 | Demers | 74/490.06 |
| 5,259,722 | * 11/1993 | Inoue et al. | 414/735 |
| 5,877,960 | * 3/1999 | Gross et al. | 700/175 |
| 5,945,011 | 8/1999 | Takano et al. | 219/108 |
| 5,966,308 | * 10/1999 | Kazirskis et al. | 700/195 |
| 5,968,384 | * 10/1999 | Willems | 219/125.1 |
| 6,040,554 | * 3/2000 | Terada et al. | 219/124.34 |

* cited by examiner

*Primary Examiner*—William Grant
*Assistant Examiner*—Zoila Cabrera

(57) ABSTRACT

The Boiler Automated Welding System (BAWS) is an automatic welding system for repair of worn boiler tubes in cyclone boilers. Repair of these tubes is essential for extending the life of this component used within electrical power plants. The BAWS utilizes: 1) a multiaxis positioner which forms the required cylindrical coordinate motion system, 2) a tube tracking systems for determination of motion paths during welding, 3) a two axis gimbaled welding torch holder for orientation of the welds relative to the motion path, 4) an integrated welding system and 5) a computer controller which coordinates these devices in a logical method.

The BAWS multiaxis positioner allows for orientation of the system within the cyclone boiler to take advantage of the symmetry of the tube layout (cylindrical coordinates). The positioner allows each individual tube to be scanned and a weld path determined using a laser scanning device. This information is then processed through the computer which coordinates the multiaxis positioner, welding system, and gimbaled torch holder to place a weld bead upon the scanned tube. This process is repeated systematically until the surface of one tube is covered with new weld metal. The entire sequence is then repeated on adjacent boiler tubes until the cyclone boiler unit is completed.

1 Claim, 15 Drawing Sheets

WELD SCHEDULE DATABASE TABLE

| ID | TIME | TRAVEL | ARC VOLT | WIRE SPEED | MOVE |
|----|------|--------|----------|------------|----------|
| 1  | 2    | 0      | 0        | 0          | ABSOLUTE |
| 2  | 0.2  | 0      | 18.5     | 350        | RELATIVE |
| 3  | 8    | 22     | 18.5     | 350        | RELATIVE |
| 4  | 25   | 22     | 18.5     | 350        | RELATIVE |
| 5  | 17   | 22     | 18.5     | 350        | RELATIVE |

| ROTATION | RADIAL | Z AXIS | Z1 AXIS | GIMBAL A |
|----------|--------|--------|---------|----------|
| 25       | 58     | 2      | 14      | 30       |
| 25       | 58     | 2      | 14      | 30       |
| 22.5     | 58.1   | 2.05   | 14      | 30       |
| 20       | 58.2   | 2.1    | 14      | 30       |
| 17.5     | 58.1   | 2.15   | 14      | 30       |

| GIMBAL B | SHIELD | WELD |
|----------|--------|------|
| 5        | YES    | NO   |
| 5        | YES    | YES  |
| 5        | YES    | YES  |
| 5        | YES    | YES  |
| 5        | YES    | YES  |

FIGURE 12

BOILER AUTOMATED WELDING SYSTEM (BAWS)

BACKGROUND OF ART

The electrical power generating companies that operate in the United States and throughout the world utilize coal fired boilers to generate electrical energy. The coal is combusted in a burner and the heat used to generate high pressure steam. The steam drives a large turbine which in turn drives an electrical generator.

The basic concept for generating electrical power from combusting coal is straight forward. The design and implementation of the process is however complex. Many critical features must be met within the design, fabrication and operation of a coal fired power plant. One critical component is the coal combustion and heat exchanger unit. One design is referred to as a "cyclone boiler" within the power generation industry. This design has been implemented in over one hundred power plants throughout the world to utilize coal for the generation of electric power.

FIG. 1 shows the design and operation of a cyclone boiler 10. Combustion air 12 is blown into the side of the cyclone tangent to the cylindrical axis. Coal 11 is injected in a similar manner at one end of the burner. As the coal and combustion air 13 swirl in a cyclonic fashion through the burner, the coal 11 is combusted. Heat released from coal combustion heats the walls of the cyclone boiler 10 which in turn provides the ignition temperature for incoming coal 11 and combustion air 13. The result is a steady state burn of coal and air as they are mixed in the cyclone boiler 10. Multiple cyclone boilers are used on a power generating unit. The highest operating temperatures in the power generating unit are achieved inside the cyclone boiler 10.

The incoming coal 11 has some non-combustible constituents. These non-combustible constituents melt from the heat in the boiler and form slag. Much of the slag is deposited on the walls of the cyclone boiler 10 by the cyclonic action of the gases as they pass through the burner. Gravity pulls the slag down the walls and then out through a slag hole. The slag hole is at a low point in the exhaust end of the burner.

The radiant heat from coal combustion and the convective heat from the hot gases and slag are used to generate high pressure steam. To accomplish this the cyclone boiler walls are built from steel tubing called boiler tubes 14. Water is pumped through the boiler tubes 14 to collect the heat and to prevent the tubes from melting. The pressure and flow rate of water are controlled to generate the desired steam temperature and pressure.

If the boiler steel tubing directly contacts the slag and the hot combustion gases it results in rapid erosion of the tubing surface. To prevent this the tubes have a refractory coating applied over the surface which limits the tube exposure to the combustion gases and slag During the service life of the boiler, the slag erodes the refractory coating leaving the boiler tubes exposed. The exposed tubes erode until the wall thickness of the boiler tubes make the cyclone boiler unusable. At the end of life it becomes necessary to replace the cyclone boilers 10. The boilers are cut out and new ones welded in. This is an expensive process and adds substantially to the cost of operating a power plant.

A method to repair these eroded boiler tubes 14 using weld overlay 18 is shown in FIG. 2. A boiler tube cross section 16 is illustrated before and after application of weld overly 18. Erosion of the boiler tubes 14 produces wall thinning 17 on the side of the tube exposed to the combusting coal and air. By application of weld overlay 18 to the boiler tube the wall thickness can be repaired. FIG. 2 illustrates a repaired boiler tube wall 19. Repair of the boiler tube wall can greatly extend the service life of a cyclone boiler 10 resulting in substantial savings in operating costs.

The difficulties in applying weld overlays 18 in a reliable manor are substantial. The areas of difficulty which must be solved by any method used are as follows:

Scheduled shutdown periods for maintenance on power plants are held to minimal time to maximize revenues. These scheduled shutdowns are too short in duration to utilize manual welding techniques. However, a fully automated method of weld overlay can meet the time requirements for scheduled plant shutdowns. Also the weld quality is more consistent with automated welding than with manual methods.

The boiler tubes 14 are distorted which results from years of use and repair work done in the boiler. This distortion creates an irregular path for the weld overlay. To automate the weld overlay process, each boiler tube must be measured to determine a weld path prior to welding. The automated system should perform both the measurement of the tubes and the weld overlay process. To make the weld path measurements, a frame of reference for measuring needs to be created in the cyclone boiler. The automated welding system must provide this frame of reference.

The boiler tubes 14 must be repaired in place. Access to the tubes is obtainable only through a 34 inch access man hole. Furthermore, there are no flat surfaces in the boiler to work from as equipment staging areas. The interior profile is a horizontal cylinder with a split wall at the top of the cylinder. The split wall has a radial offset creating a tangential opening for combustion air. The ends of the cyclone boiler are conical sections with the man hole access in one end. Several complex tube geometries exist in a cyclone boiler 10. To automate weld overlay on these tubes requires an innovative and versatile automated mechanism which can be installed in the cyclone boiler and manipulate a welding torch to track these various geometries. Heretofore, existing automated welding systems have not provided an easy to use, low labor means which meet these criteria that could be used to repair boiler tubes 14 in place in a cyclone boiler 10. This invention provides an innovative means for applying weld overlay 18 on cyclone boiler tubes. This invention called a Boiler Automated Welding System (BAWS) uses a unique and innovative combination of sensing technology, welding system, computer systems and a automated motion system. This system applies weld overlays 18 by a highly automated process which accommodates the cyclone boiler geometry and the varying wall thickness of boiler tubes 14.

OBJECTS AND ADVANTAGES

Accordingly, several objects and advantages of the BAWS are as follows:

The BAWS provides a method to access the inside of a cyclone boiler 10 with a automated welding system. This automated welding system performs the function of applying weld overlay 18 on existing boiler tubes 14. The weld overlay 18 is performed by the BAWS in a fully automatic mode. The process requires only occasional monitoring by the operating personnel. This allows the weld overlay process to be performed 24 hours a day to minimize the boiler down time. The automatic process produces a uniform weld overlay which allows an eroded boiler to be repaired and extend its useful life. Prior weld overlay technologies have not adequately solved all these issues.

The BAWS uses its own motion coordinate system as the coordinate space in the cyclone boiler. The position of each boiler tube is measured in terms of this coordinate space. This is accomplished with a tube tracking system which attaches to the motion system near the welding torch. The tube tracking system uses a laser range finder to measure tube location. The tube tracking system position measurements are used with motion system's coordinate positions to determine tube location in BAWS coordinate space Each tube's location is measured just prior to the application of the weld overlay to that tube. During the weld overlay the tube tracking system measures tube movement caused by weld heat distortion. This measurement is used to adjust the torch height during the welding process. This allows the BAWS to accurately track a boiler tube while placing weld overlay on the tube. This solves both problems of tracking tubes that have been distorted by routine boiler operation and tracking the movement of the tubes during weld overlay process.

The BAWS provides constant travel speed at the tube surface. This allows the parameters for weld overlay to be developed that accommodate varying wall thickness in the boiler tube. Parameters are balanced so that the thin walled areas are not melted through and the thick wall areas do not get cold laps in the weldment. This is more difficult to achieve without weld automation.

The BAWS provides easy setup and monitoring of the process by the operator. A remote pendant allows the operator to program setup parameters. The pendant incorporates joysticks, mouse control and a computer flat panel display. The pendent gives full control of the process to the operator as he moves around the boiler.

Observing the welding process in the boiler is a difficult process due to the limited access into the boiler and the space occupied by the motion system. A video camera is incorporated into the system to solve this problem. The camera allows direct viewing of the weld pool. The video image is displayed on the operators remote pendant. The video system aids the operator in setup of the system and in monitoring the weld overlay process.

Further objects and advantages of the BAWS invention will become apparent from consideration of the drawings and ensuing description of it.

DESCRIPTION OF DRAWINGS

FIG. 12 is a table of the weld schedule database.

Figure 1:
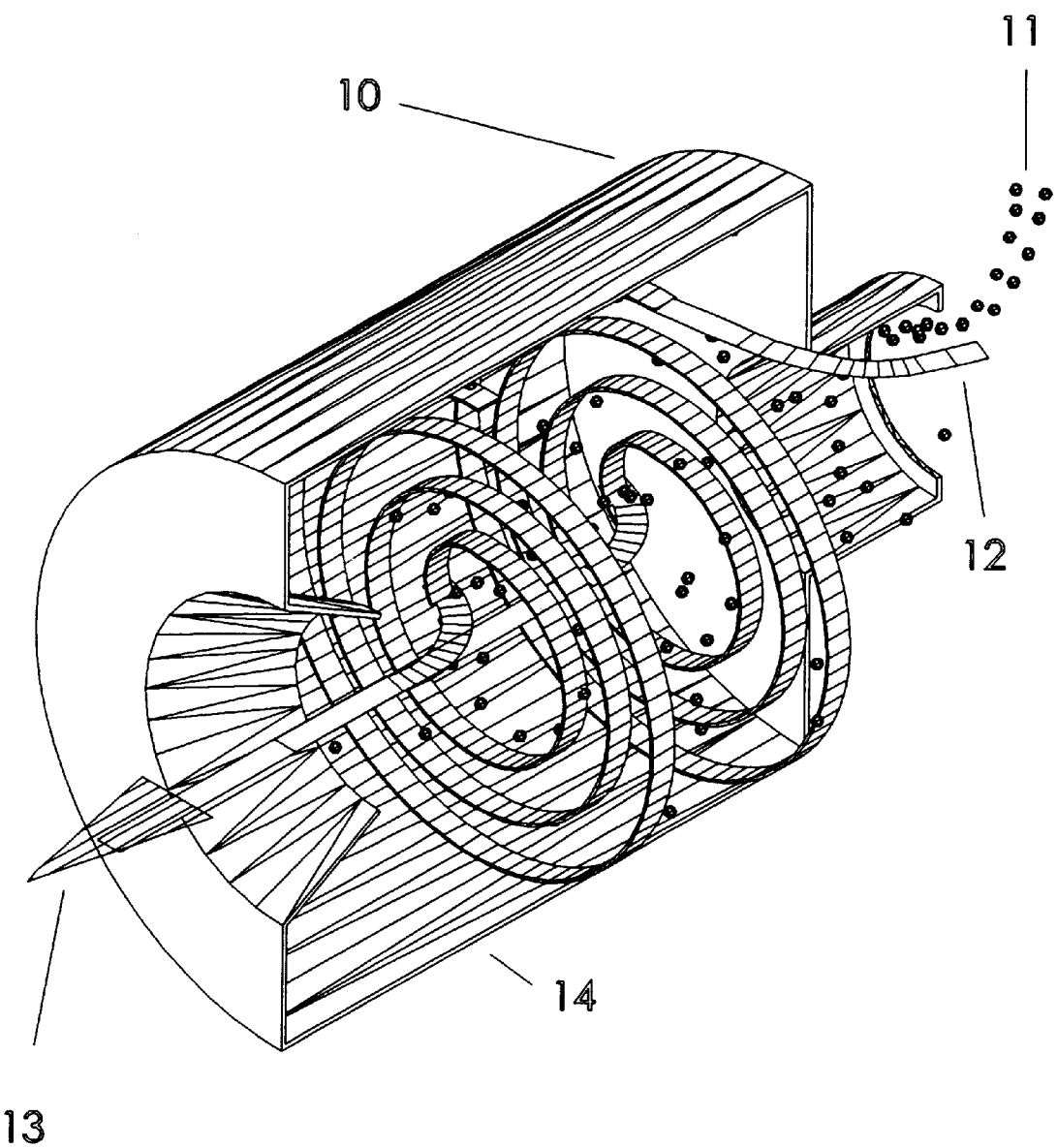
FIG. 1 is a prior art illustration that shows the design and operation of a cyclone boiler.

| List of Reference Numerals | |
|---|---|
| 10 | cyclone boiler |
| 11 | feed coal |
| 12 | combustion air |
| 13 | flame |
| 14 | boiler tubes |
| 16 | boiler tube cross section |
| 17 | wall thinning |
| 18 | weld overlay |
| 19 | repaired boiler tube wall |
| 20 | flat panel display |
| 21 | right joystick |
| 22 | left joystick |
| 23 | joystick mouse |
| 24 | emergency stop |
| 25 | operator pendant |
| 30 | rotation axis stepper motor |
| 31 | rotation axis rotary gear box |
| 32 | Z axis stepper motor |
| 33 | Z axis gear box |
| 34 | radial axis stepper motor |
| 35 | radial axis gear box |
| 36 | Z1 axis gear box |
| 37 | Z1 axis stepper motor |
| 38 | rotary rail slide |
| 39 | radial slide |
| 40 | shuttle slide |
| 41 | welding torch |
| 42 | cross bar supports |
| 43 | boiler tubes |
| 44 | Z axis carriage |
| 45 | Rotational axis bearing support |
| 50 | tool point |
| 52 | tool point motion |
| 53 | gimbal A semicircular gear |
| 54 | gimbal A semicircular rail |
| 55 | gimbal B support |
| 56 | gimbal A gear box carriage |
| 57 | gimbal A stepper motor |
| 58 | gimbal B gear box carriage |
| 59 | gimbal B stepper motor |
| 60 | gimbal B semicircular gear |
| 61 | gimbal B semicircular rail |
| 70 | computer controller |
| 71 | constant voltage power supply |
| 72 | welding wire feeder |
| 73 | welding power cable |
| 74 | electrical power cable |
| 75 | weld pool |
| 76 | computer welding control cable |
| 77 | ground cable |
| 90 | tube centerline |
| 92 | laser distance gauge |
| 93 | laser beam |
| 94 | tube tracking slide |
| 95 | tube tracking stepper motor |
| 96 | tube tracking sensor |
| 97 | tube profile |
| 100 | CCD video camera |

-continued

List of Reference Numerals

| 101 | neutral density filter |
|-----|------------------------|
| 102 | lens                   |

DESCRIPTION OF INVENTION

Figure 3:
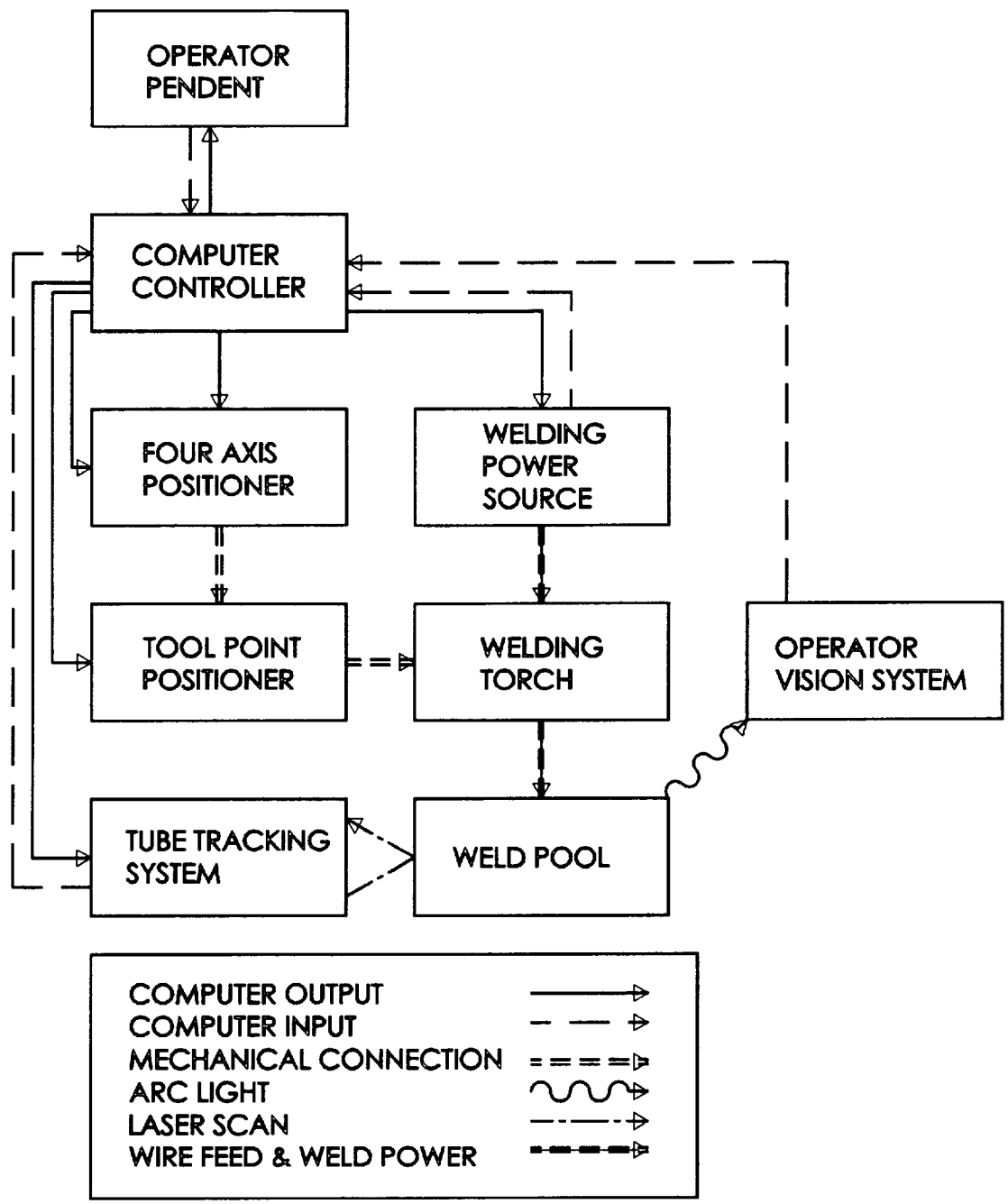
FIG. 3 is a block diagram that shows the separate components that form the BAWS integrated system. Separate components are connected to each other through electrical cables. These cables provide power, command signals and feedback signals between the separate components.

FIG. 3 shows a block diagram of the major components of the boiler automated welding system (BAWS). The BAWS integrated system is composed of the separate components shown in FIG. 3. The separate components are a computer controller, an operator pendant, a four axis positioner, a tool point positioner, a welding torch, a welding power source, a tube tracking system and an operator vision system. The separate components of the integrated system work together to form an automated system capable of applying weld overlay in cyclone boilers.

The separate component are interconnected by electrical cables to form the integrated system. Three types of electrical cables are used to interconnect the separate components. These are 1) power cables, 2) computer input/output cables, and 3) welding cables. The cabling system is shown in FIG. 3. The details of the cabling system are as follows:
Computer Controller to Pendent I/O Cable One input/output electrical cable connects the computer controller 70 to the operator pendant 25. This cable provides the following functions:

Flat panel display 20 signal form the computer to the pendant.

Joystick 21–22 and mouse 23 signals from the pendant to the computer

Power for the operator pendant 25 from the computer controller

Computer Controller to Tube Tracking System I/O Cable

A second input/output electrical cable connects the computer controller to the tube tracking system. This cable provides the following functions:

Power to the laser distance gauge 92

Analog signal from the laser distance gauge 92 to the computer

Stepper motor power for the stepper motor 95 in the tube tracking system

Computer Controller to Welding Power Source I/O Cable

A third input/output electrical cable connects the computer controller to the welding power source. This cable provides the following functions:

Welding contactor closure signal from the computer

Analog control signal for arc voltage to the welding power source

Analog control signal for wire speed to the welding power source

Analog input to the computer for arc voltage measurement

Analog input to the computer for arc current measurement

Analog input to the computer for wire speed measurement

Computer Controller to Operator Vision System I/O Cable

A fourth input/output electrical cable connect the operator vision to the computer controller. This cable provides the following functions:

Power to the CCD video camera 100

Video signal from the camera to the computer controller

Computer Controller to Four Axis Positioner Output Cable

The computer controller is connected to the four axis positioner by an output electrical cable. This cable provides the following functions:

Power to the rotational axis stepper motor 30

Power to the Z axis stepper motor 32

Power to the radial axis stepper motor 34

Power to the Z1 axis stepper motor 37

Computer Controller to Tool Point Positioner Output Cable

The computer controller is connected to the tool point positioner by an output electrical cable. This cable provides the following functions:

Power to the gimbal A stepper motor 57

Power to the gimbal B stepper motor 59

Welding Power Cable

The welding power source is connected to the welding torch by a cable that carries the weld wire and welding power. The welding process used is the gas metal arc welding process.

Mechanical Connections

The four axis positioner mechanically connects to the tool point positioner. The tool point positioner attaches to either end of shuttle slide 40 on the four axis positioner. The welding torch is mechanically connected to the tool point positioner. The tool point positioner has an integral mount for welding torch 41.

Optical Connections

Two optical connections are used in the BAWS integrated system. One connection is made by the tube tracking system. The tube tracking system generates a laser beam that is directed at the tube near the weld pool. The reflected beam is sensed by the tube tracking system. This laser beam optically connects the tube tracking system with the boiler tube. The second optical connection is made between the weld pool 75 and the CCD video camera 100. The light emitted from the weld pool is sensed by the CCD video camera to provide an optical picture for the operator.

These separate components and their electrical, mechanical and optical connections form the BAWS integrated system. The details of the construction of these separate components and their operation is given in the ensuing descriptions.

Computer Controller:

The computer controller provides the command and control of the integrated system. This is accomplished through hardware and software developed for this system.

Figure 4:
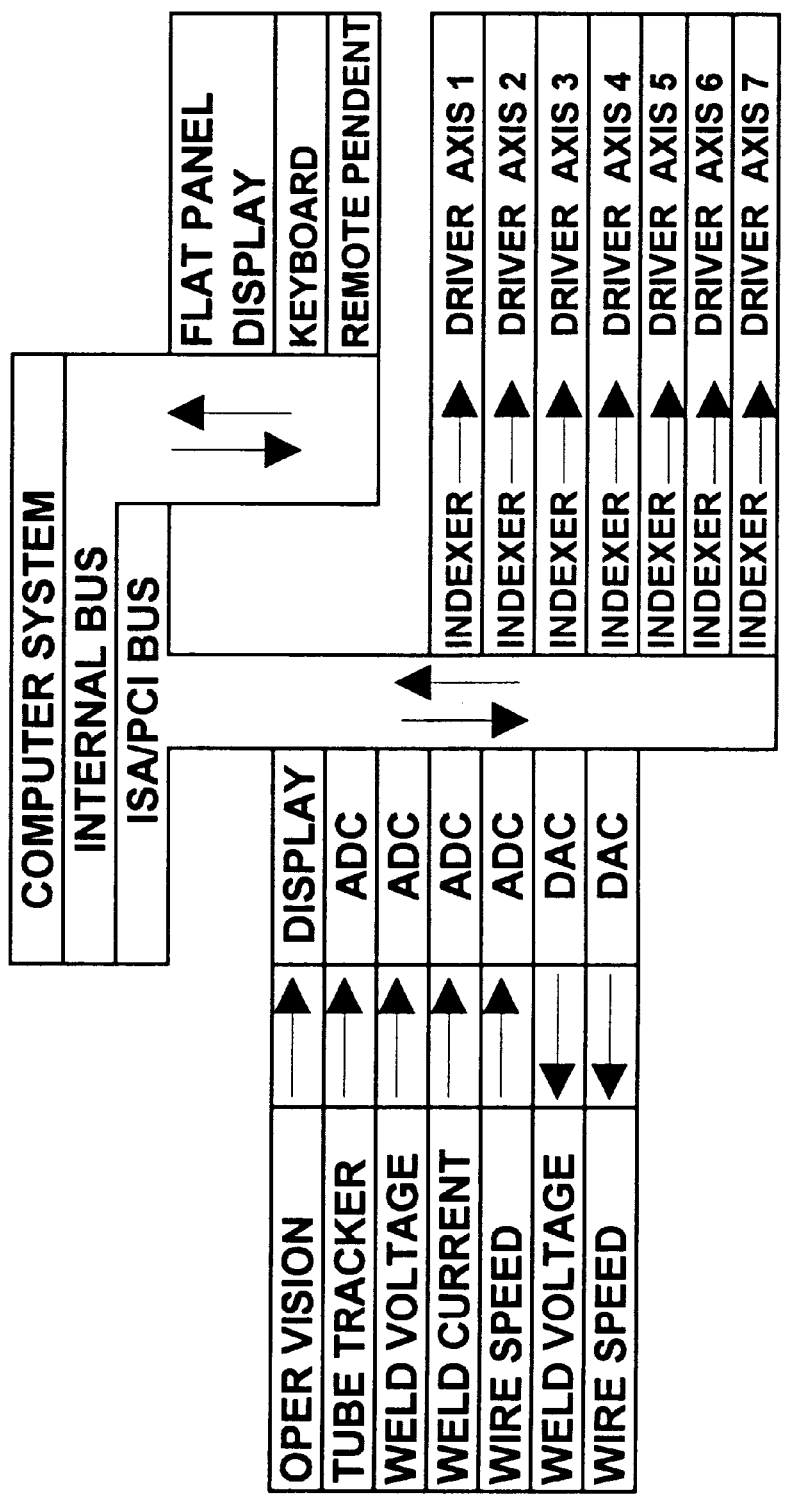
FIG. 4 is a block diagram of the computer controller component.

FIG. 4 is a block diagram of the computer controller hardware. The housing for this component is a commercially available 19 inch rack cabinet mounted on a caster wheels for mobility. The cabinet is dust tight to prevent external contamination from interfering with the operation of the electrical equipment. An industrial personal computer (PC) is mounted in the 19" rack of the computer controller cabinet. This PC system consists of an industrial rack enclosure, an ISA/PCI passive backplane, a single board computer with an Intel Pentium processor, a floppy drive, a hard drive, a CD ROM a keyboard, power supply, a flat panel VGA monitor and cooling fans. Though this is one embodiment of the computer system, several computer systems and bus structures currently available on the market can be used.

The single board computer is connected to the integrated system through peripheral devices. These peripheral devices plug into the computer ISA/PCI passive backplane. The peripheral devices consist of analog-to-digital/digital-to-analog converter boards, a real time video image board, stepper motor indexer boards, and digital I/O lines available on these boards.

Four channels of analog to digital (A/D) and two channels of digital to analog (D/A) are used in the construction of the BAWS. These channels are connected directly to the corresponding separate components through the interconnecting I/O cables. The separate components and the functions in these separate components connected to these channels are as follows:

A/D channel input from the laser distance gauge 92 in the tube tracking system
  A/D channel input measuring arc voltage from the welding power source
  A/D channel input measuring arc current from the welding power source
  A/D channel input measuring wire speed from the welding power source
  D/A channel output controlling arc voltage setting in the welding power source
  D/A channel output controlling wire speed setting in the welding power source A video display board in the computer controller provides the display of the welding image on the flat panel display 20. This board is a PCI board that mounts in one of the computer's PCI slots. Several commercially available boards are available for this purpose. The video signal is received by the video display board from the CCD video camera 100 using a standard video cable. The video display board works with the computers display driver board to overlay the video image onto the computer display. The video image displayed on the computer flat panel 20 is real time.

Stepper motor indexer boards are connect to the computer's ISA bus. These boards provide the seven axis of control required by the BAWS integrated system. The output from each stepper motor indexer channel is cabled to a stepper motor driver. These drivers are located in the computer controller cabinet. Output cables connect the outputs from the stepper motor drivers to the corresponding stepper motor on the four axis positioner, the tool point positioner, and the tube tracking system. The use of the seven channels of stepper motor axis is as follows:

Axis one drives the rotational axis of the four axis positioner
  Axis two drives the radial axis of the four axis positioner
  Axis three drives the Z axis of the four axis positioner
  Axis four drives the Z1 axis of the four axis positioner
  Axis five drives gimbal A on the tool point positioner
  Axis six drives gimbal B on the tool point positioner
  Axis seven drives the tube tracking slide on the tube tracking system Two channels of digital I/O are used in the BAWS integrated system. These digital I/O channels are follows:

Digital input: One digital input is used to monitor the emergency spot for the system. This input monitors the crash sensor on the four axis positioner, the emergency stop button on the operator pendant, and the emergency stop on the computer controller cabinet. If any of these normally open switches close then the welding contractor is opened to shut off welding power and the stepper motor drivers are halted to stop all mechanical motion.
  Digital output: One digital output is used to close the welding contactor to provide power to the welding power.

Figure 5:
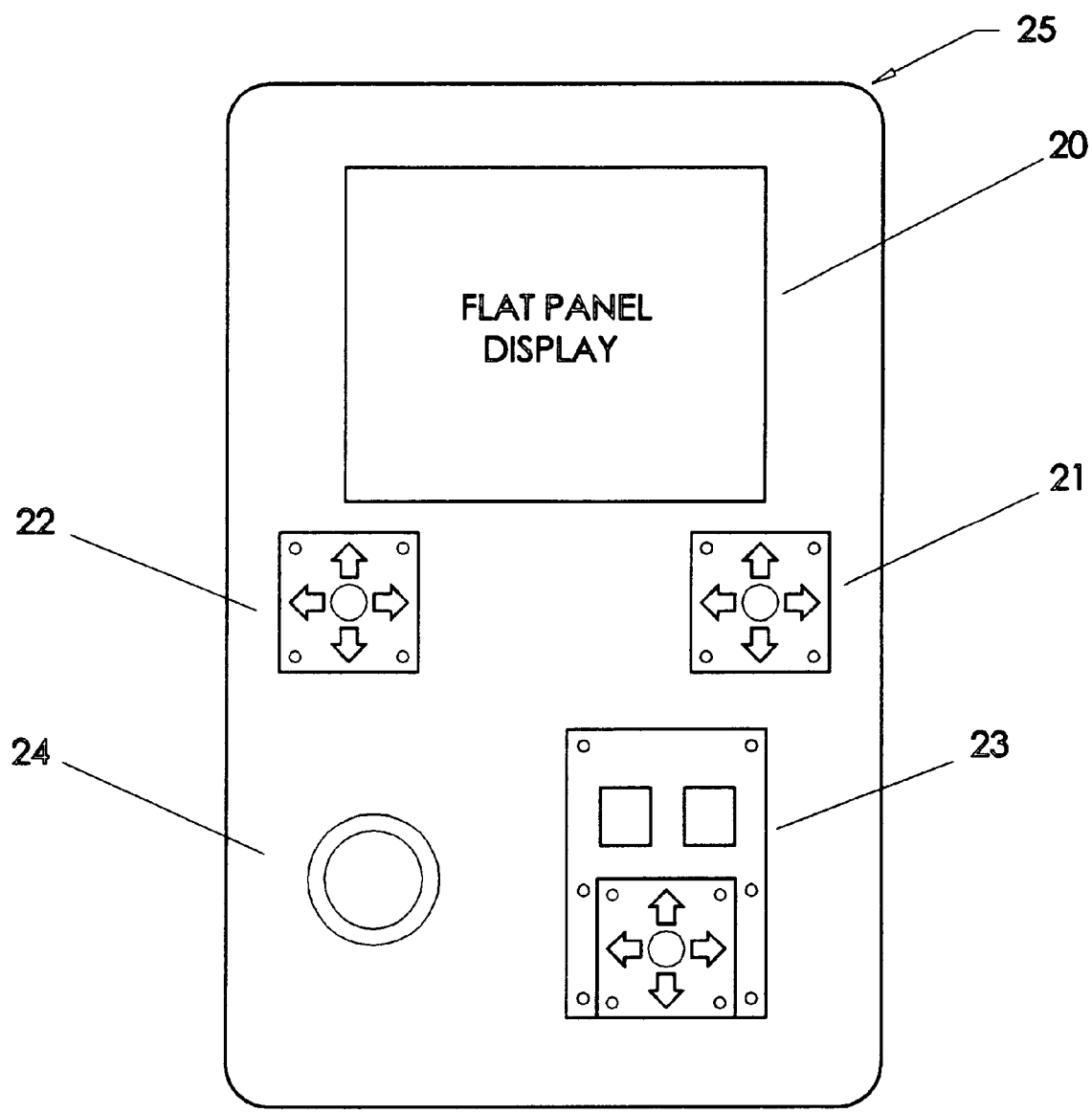
FIG. 5 is the layout of the BAWS operator pendant component.

Operator Pendant:

FIG. 5 shows the layout of the operator pendant 25. The pendant houses a flat panel display 20, a right hand joystick 21 with two directions of motion, a left hand joystick 22 with two directions of motion, a mouse joystick 23 with three buttons and an emergency stop button 24. The operator pendant 25 is connected by an input/output cable to the computer controller. The operator pendant 25 extends the equivalent functions available at the computer controller to a hand held unit that can be used around the cyclone boiler.

Figure 6:
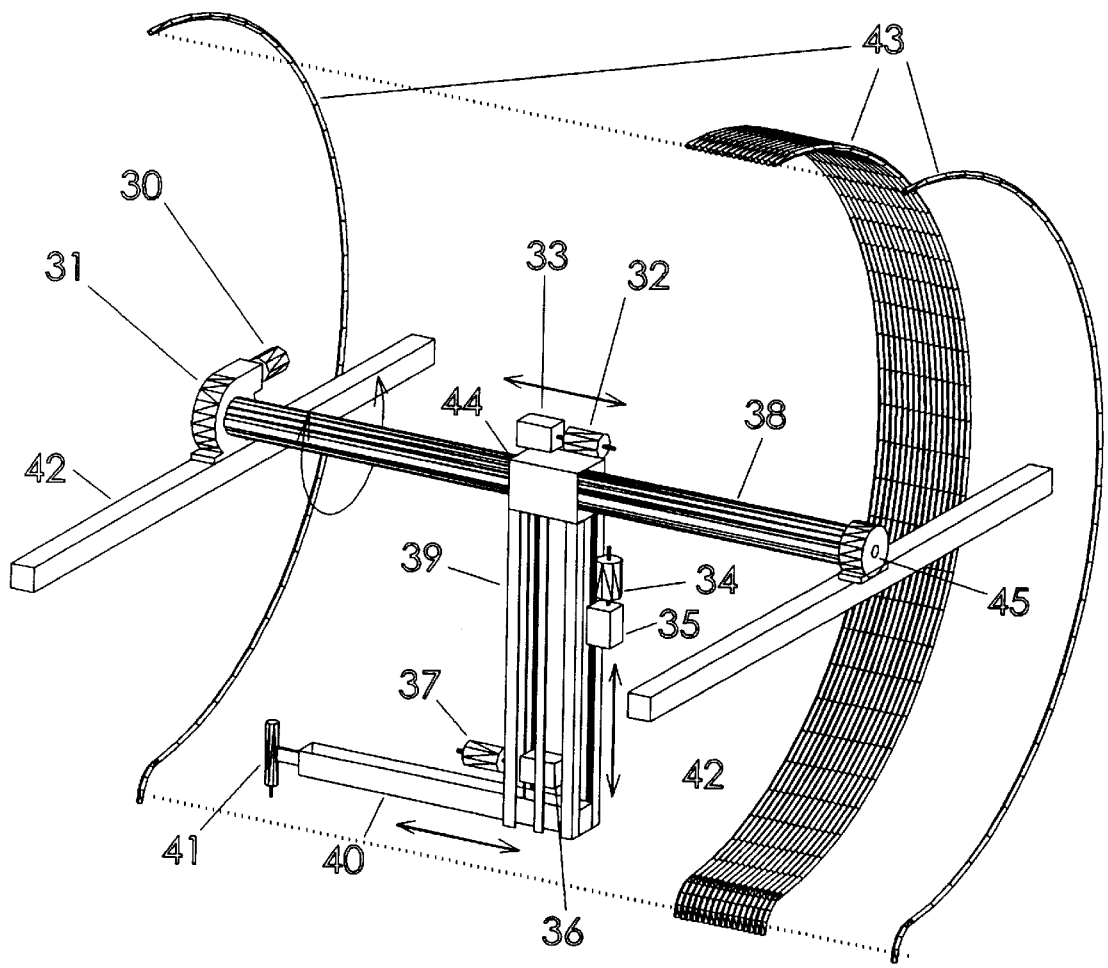
FIG. 6 is an isometric view of the 4 axis automated positioner component.

Four Axis Positioner:

FIG. 6 shows an isometric view of the four axis positioner as it sets in the cyclone boiler. Part of the cyclone boiler tubes 43 are also shown in FIG. 4. The four axis positioner is comprised of four independent motion axis. Three of these axis form a cylindrical coordinate system. These axis are designated the rotational axis, the radial axis, and the Z axis. This cylindrical coordinate system is designed to fit the cylindrical shape of a cyclone boiler. The fourth axis extends the reach of the Z axis to allow the four axis positioner to reach beyond the cross bar supports 42 to the end walls of the cyclone boiler. The geometry of the four axis positioner allows the system to position a welding torch to all points in the cyclone boiler walls. The construction of the BAWS four axis positioner is detailed in the following.

The cross bar supports 42 attach to the cyclone boiler tubes 43. These cross bar supports 42 hold the four axis positioner in a fixed location in the cyclone boiler. They provide the only points of contact between the four axis positioner and the cyclone boiler.

The rotational axis is comprised of a rotational axis stepper motor 30, a rotational axis rotary gear box 31, a rotary rail slide 38, and rotational axis bearing support 45. The rotational axis stepper motor 30 attaches to and is supported by the rotational axis rotary gear box 31. The rotational axis rotary gear box 31 attaches to and is supported by the cross bar support 42. A rotational axis bearing support 45 is mounted on the opposite cross bar support 42 to attach the rotary rail slide 38 to the cross bar supports 42. The rotary slide rail 38 attaches to the rotational axis rotary gear box 31. The assembly of these parts provides the rotary motion about the axis of the cyclone boiler. The rotational axis stepper motor 30 provides the torque to drive the rotational axis gear box 31., The rotational axis gear box 31 intern provides the drive torque to rotate the rotary slide rail 38 about the rotational axis gear box 31 and the rotational axis bearing supports 45.

The Z axis is comprised of a Z axis stepper motor 32, a Z axis gear box 33, and a Z axis carriage 44. The Z axis stepper motor 32 attaches to and is supported by the Z axis gear box 33. The Z axis gear box 33 mounts on the Z axis carriage 44. The Z axis carriage 44 mounts on the rotary slide rail 38. The Z axis stepper motor 32 provides the drive torque to the Z axis gear box 33. The Z axis gear box 33 drives the Z axis carriage along the rotary slide rail 38. This provides the motion along the linear coordinate of the cylindrical coordinate axis.

The radial axis of the four axis positioner is comprised of a radial slide 39, a radial axis stepper motor 34, and a radial axis gear box 35. The radial slide 39 mounts to and is supported by the Z axis carriage 44. The radial axis stepper motor 34 attaches to and is supported by the radial axis gear box 35. Radial axis gear box 35 mounts on the radial slide 39. The radial axis stepper motor 34 provides the drive torque to the radial axis gear box 35. The radial axis gear box 35 intern provides the drive torque to move the shuttle slide 40 in the radial direction of the cylindrical coordinate system.

The shuttle slide 40 mounts to the radial slide 39. Z1 axis stepper motor 37 mounts to the Z1 axis gear box 36. The Z1 axis gear box 36 mounts on the shuttle slide 40. The shuttle slide 40 provides additional motion in the linear axis direction of the cylindrical coordinate system. This axis is parallel to the Z axis and provides extended reach in that direction beyond the cross bar supports 42. This allows the four axis positioner to reach the end walls of the cyclone boiler with the welding torch.

FIG. 6 shows the welding torch 41 optionally mounted to the shuttle slide 40. In the BAWS integrated system the torch is usually mounted to the tool point positioner shown in isometric view in FIG. 7. The tool point positioner in FIG. 7 mounts to either end of the shuttle slide 40 in place of the welding torch 41 shown in FIG. 6.

Figure 7:
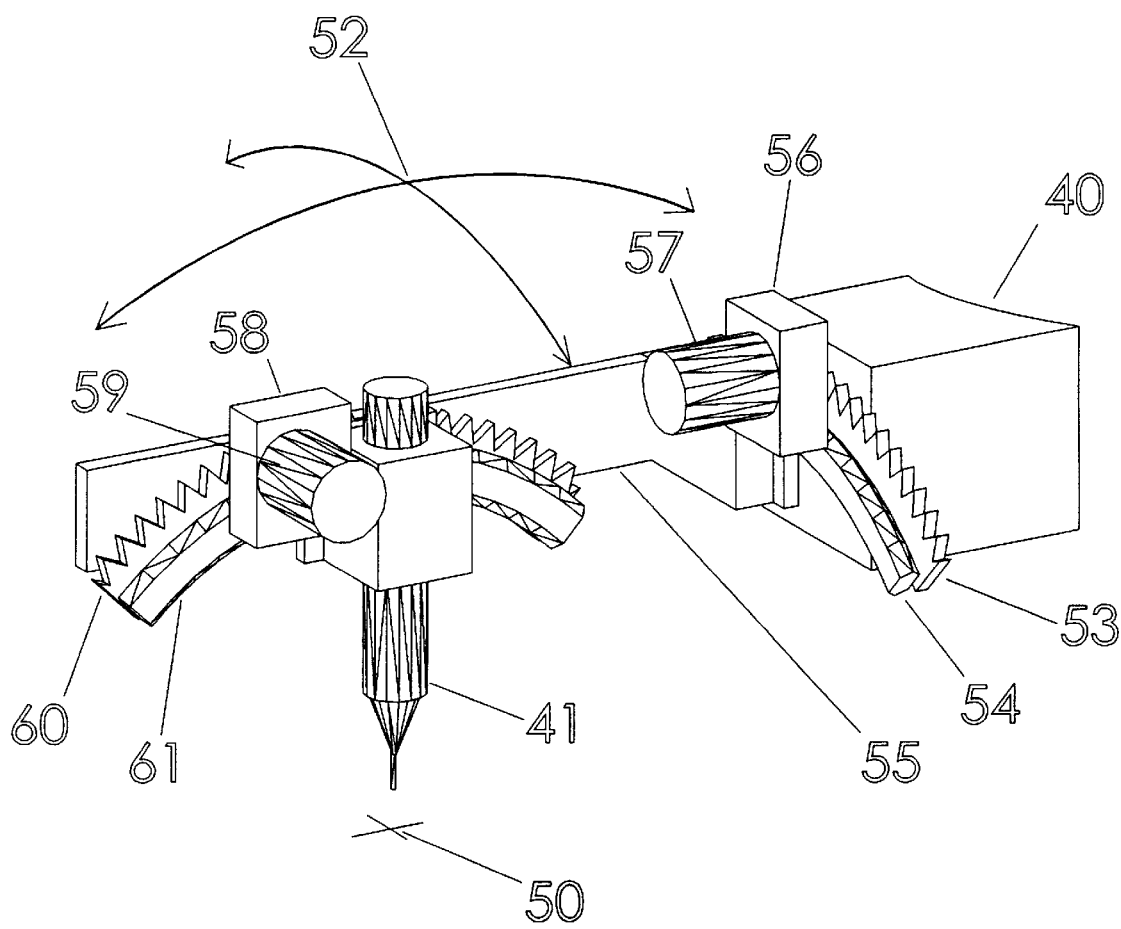
FIG. 7 is an isometric view of the tool point positioner component.

Tool Point Positioner:

FIG. 7 is an isometric illustration of the tool point positioner. The tool point positioner is comprised of two semicircular slides mounted at right angles. The tool point positioner mounts on either end of the shuttle slide 40 of the four axis positioner.

The welding torch 41 mounts in the gimbal B gear box carriage 58. The gimbal B stepper motor 59 also mounts to the gimbal B gear box carriage 58. The gimbal B stepper motor 59 provides the drive torque for the gimbal B axis. The stepper motor drives the gimbal B gear box carriage 58. The gimbal B gear box carriage 58 drives a pinion gear on the gimbal B semicircular gear 60 causing the carriage to slide in a circular path on the gimbal B semicircular rail 61. The center point of the gimbal B semicircular rail 61 is the tool point 50.

The gimbal B semicircular rail 61 and the gimbal B semicircular gear 60 mount to the gimbal B support 55. The gimbal B support 55 mounts to the gimbal A gear box carriage 56. The gimbal A stepper motor 57 also mounts to the gimbal A gear box carriage 56. The gimbal A stepper motor 57 provides the drive torque for the gimbal A axis. The stepper motor drives the gimbal A gear box carriage 56. A pinion gear in the gimbal A gear box carriage 56 engages the gimbal A semicircular gear 53. The torque from the pinion gear drives the gimbal A gear box carriage slides on the gimbal A semicircular rail 54. The center point for the gimbal A semicircular rail 54 is the tool point 50.

Figure 8:
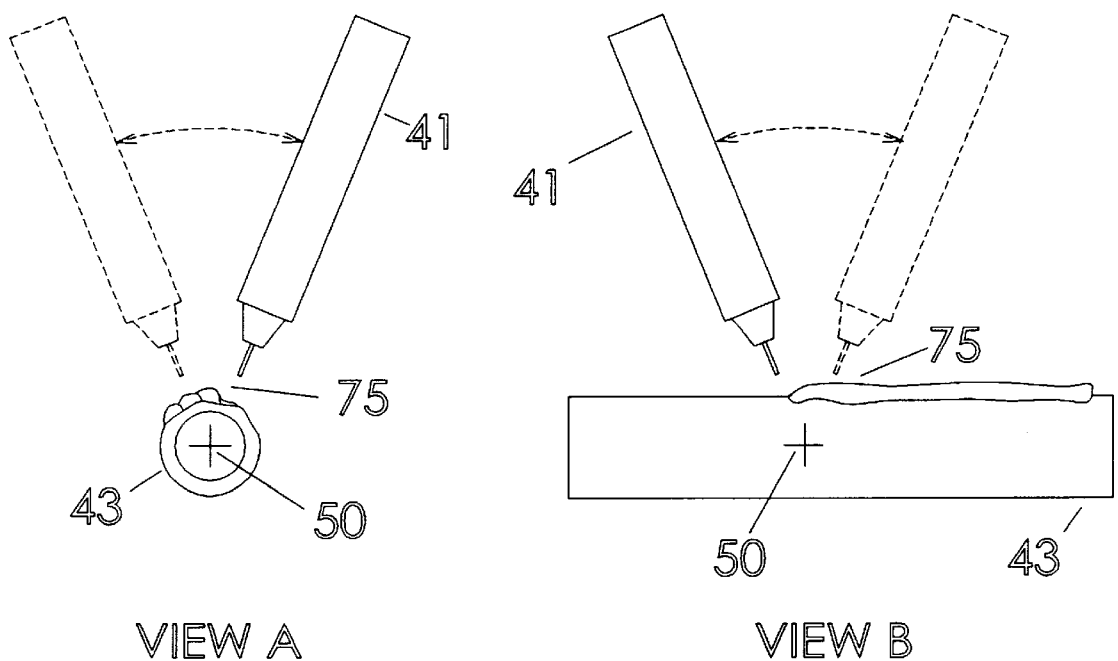
FIG. 8 is a diagram of the welding torch movement created by the tool point positioner

The motion of the tool point positioner is illustrated in FIG. 8. The gimbal A and gimbal B cause the welding torch to rotate about a center point 50 which can be located coincident with the centerline of a boiler tube. This has several advantages in operating the BAWS system.

Figure 2:
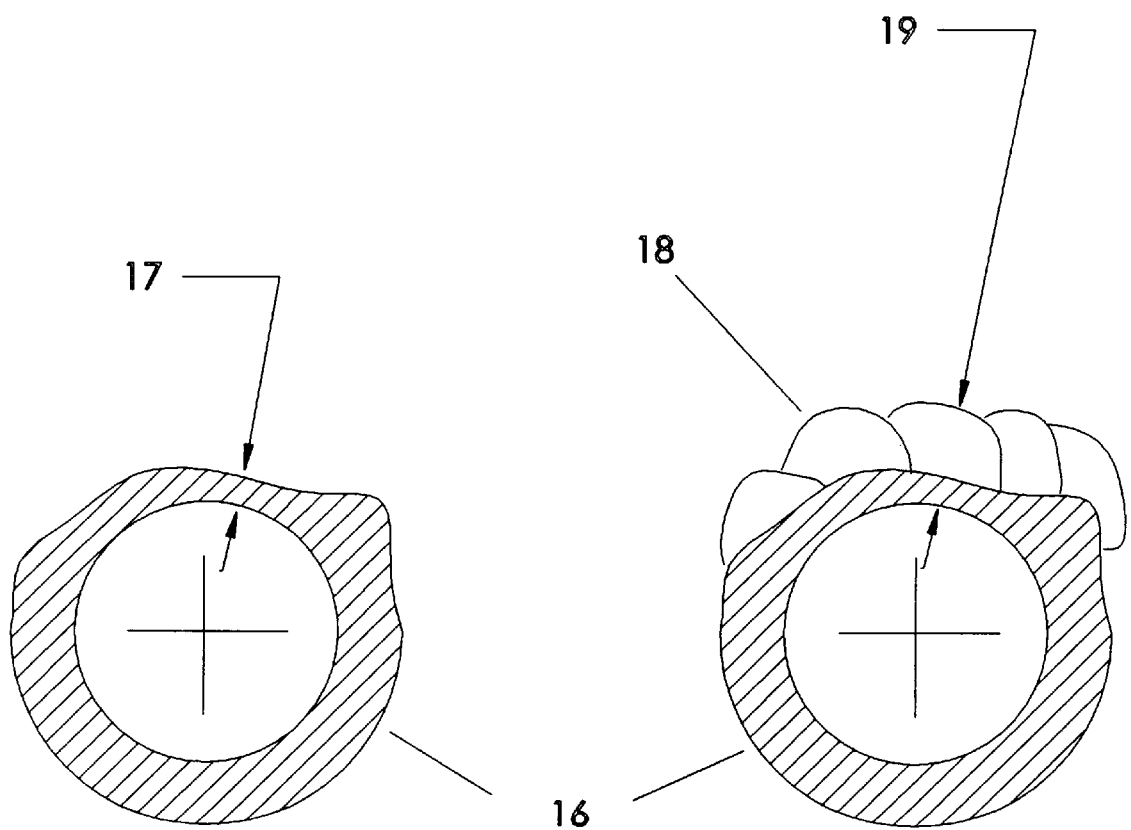
FIG. 2 illustrates the method of repairing boiler tube wall erosion with weld overlays.

If the tool point 50 is located at the centerline of the boiler tube under weld repair, multiple weld passes can be laid side by side as shown in FIG. 2. This is accomplished by repeating a single weld path of the four axis positioner but changing the gimbal axis position for each successive weld. This greatly simplifies the programming requirements of placing side by side weldments on a boiler tube.

The tool point positioner allows the operator to make on-the-fly adjustments to the amount of weld overlap as shown in FIG. 2 without the need to change the programmed path of the four axis positioner.

The torch angle of attack as shown if FIG. 8 can be changed during the welding process. This effects the characteristics of the weldment. The operator can modify the torch angle of attack to achieve the best results. This change has no effect on the programmed weld path for the four axis positioner.

Figure 9:
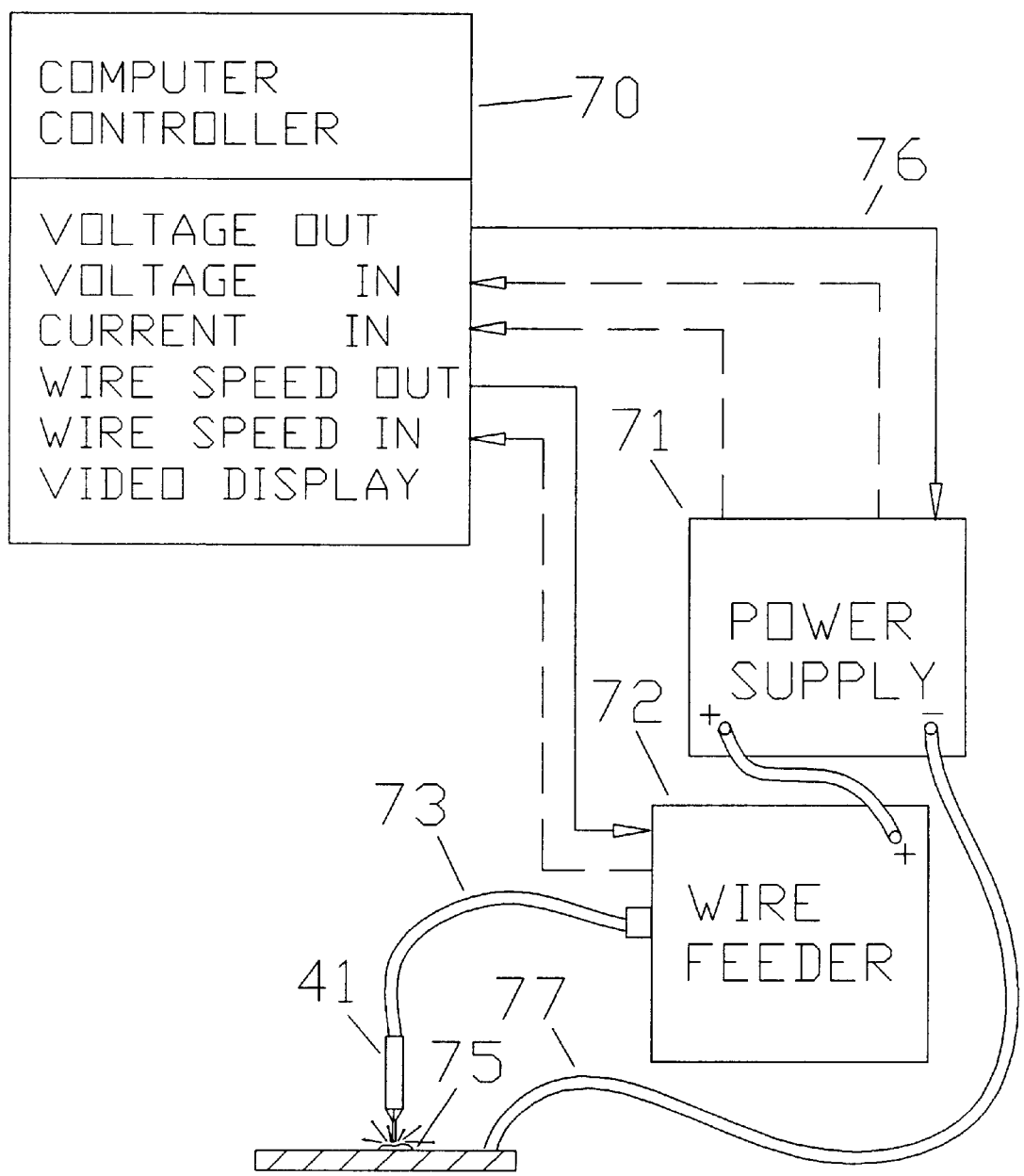
FIG. 9 is a functional diagram showing the interfacing of the welding system component to the computer controller component.

Welding Torch, Welding Power Supply:

FIG. 9 is a functional diagram of the welding torch and the welding power supply. The welding torch 41 is connected to the welding wire feeder 72 by a welding power cable 73. The welding power cable 73 connects to the welding wire feeder 72. The constant voltage power supply 71 is electrically connected to the welding wire feeder 72 by the electrical power cable 74.

The computer controller 70 is connected to the constant voltage power supply 71 and the welding wire feeder 72 by the computer welding control cable 76. The computer controller uses digital to analog converters to create 0–10 VDC signals. These signals are used by the constant voltage power supply 71 and the welding wire feeder 72 to control the arc voltage and the wire feed speed. The constant voltage power supply 71 and the welding wire feeder 72 return signals for arc volts, arc current and wire feed speed to the computer controller 70. These analog signals are input to the computer by analog to digital converters as shown in FIG. 4. The arc voltage, the arc current, and the wire feed speed are displayed to the operator on the flat panel display 20.

Figure 10:
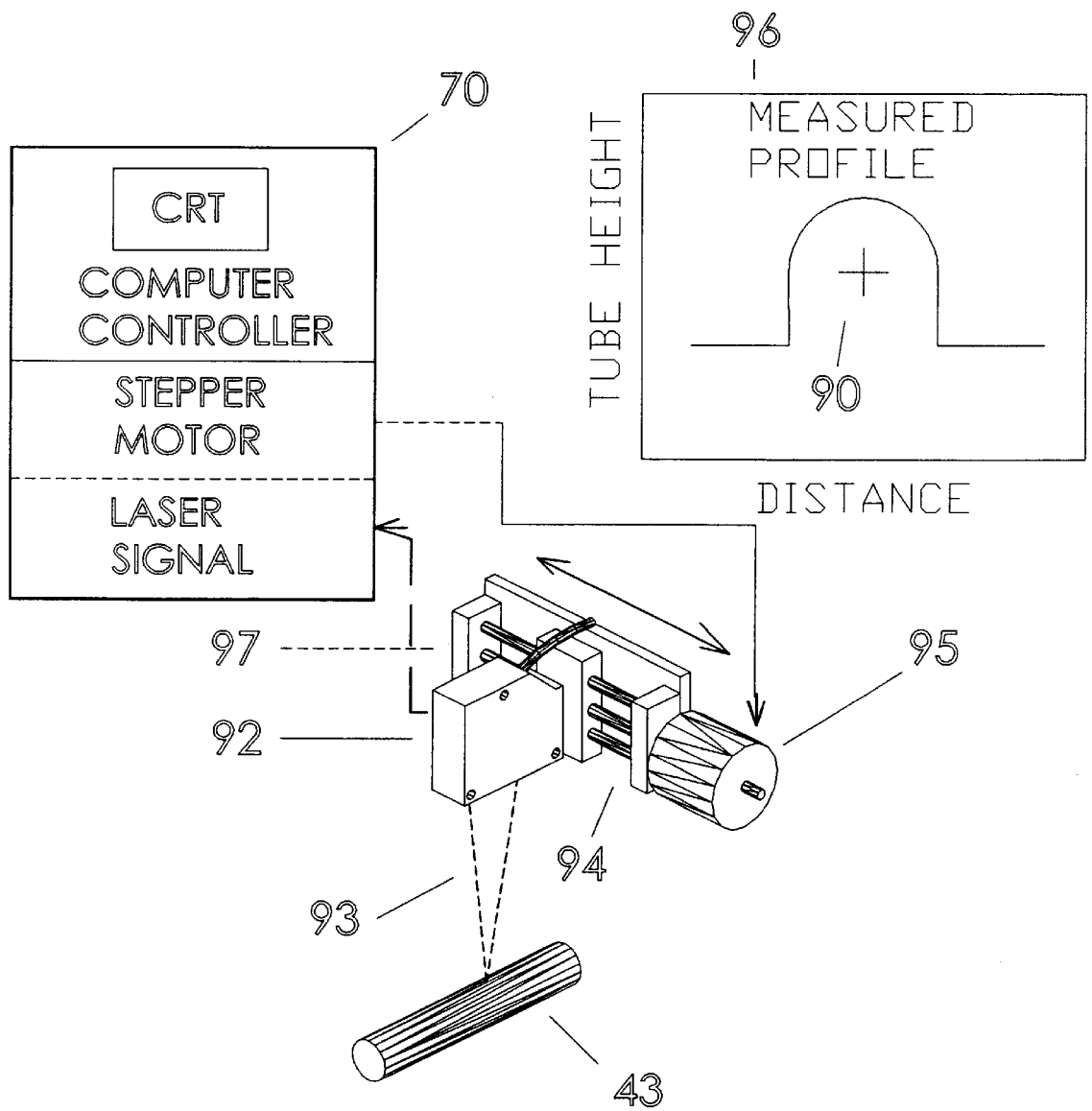
FIG. 10 is a functional diagram of parts that form the tube tracking component.

Tube Tracking System:

FIG. 10 is a functional diagram of the tube tracking system. A laser distance gauge 92 emits a laser beam 93. The laser beam 93 is reflected off the surface of the boiler tube 43. The reflected laser beam 93 is sensed by the laser distance gauge 92. An analog voltage is generated by the laser distance gauge 92 that is proportional to the distance between the boiler tube 43 and the laser distance gauge 92. The laser distance gauge 92 is mounted to a tube tracking slide 94. The tube tracking slide 94 is driven by the tube tracking stepper motor 95. A computer I/O cable connects the computer controller to the tube tracking system. A stepper motor driver in the computer controller drives the tube tracking stepper motor 95. The analog voltage signal from the laser distance gauge 92 is connected to one of the analog to digital converters in the computer system as shown in FIG. 4.

The tube tracking system is attached to either end of the shuttle slide 40 on the four axis positioner. The four axis positioner moves the tube tracking sensor over the boiler tube 43 of interest.

The tube tracking stepper motor 95 drives the laser distance gauge 92 in an oscillating manner over the tube of interest. The laser beam 93 is used by the laser distance gauge 92 to determine a dc voltage proportional to the distance between the laser distance gauge 92 and the surface being measured. The measured dc voltage is sent to the computer controller 70. An analog to digital channel in the computer controller 70 converts the dc voltage into digital number. The digital number is converted to a distance between the laser distance gauge 92 and the boiler tube 14. This information is correlated with the tube tracking stepper motor position information. The stepper motor position is obtained from the stepper motor indexer.

The distance measurement from the laser distance gauge 92 and the position of the tube tracking stepper motor 95 form a X-Y profile of the tube at the measured location in the cyclone boiler. This information is analyzed to determine the location of the boiler tube centerline. The location information is in terms of 1) the distance between the laser distance gauge 92 and the boiler tube and 2) the tube tracking stepper motor 95 position. This information is combined with the current coordinate position of the four axis positioner. From this the coordinate position of the centerline of the boiler tube at the point of measurement is determined. These coordinates provide a point along the welding path. To determine the entire weld path successive measurements are made along the tube at incremental distances.

Figure 11:
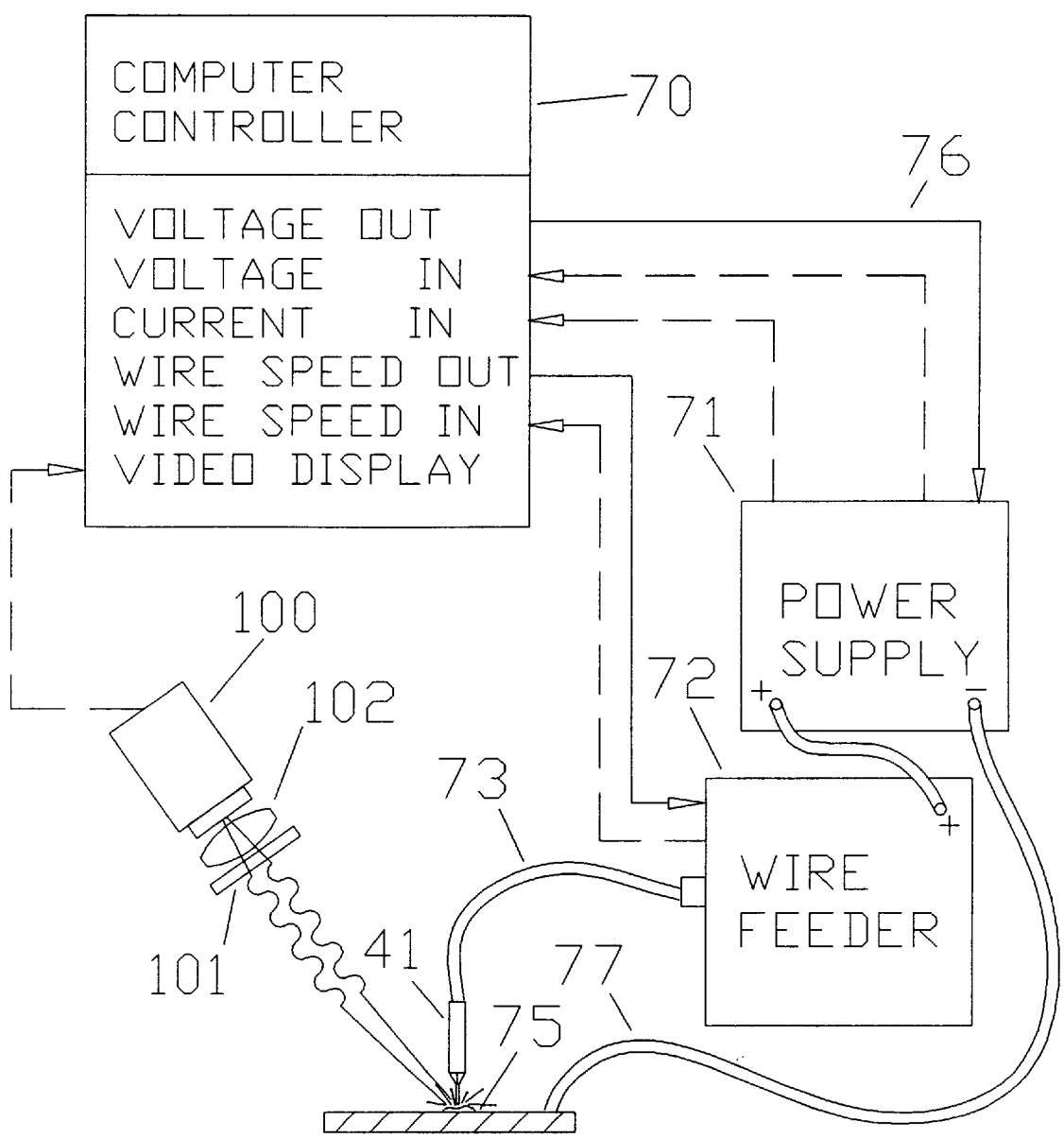
FIG. 11 is a functional diagram of the operator vision system.

Operator Vision System:

FIG. 11 illustrates the operator vision system. A commercially available CCD video camera 100 with neutral density filter 101 and a lens 102 is used. The camera is focused on the welding arc and weld pool 75. The video signal from the camera is cabled to the computer controller 70. The video signal is attached to the input of the video display card. The video display card translates the video image into computer graphics that are displayed on the computer flat panel display and the operator pendant 25. This provides the BAWS operator a view of the weld overlay process without having to enter the cyclone boiler. Because of the approximate ten power magnification from the CCD video camera 100 and lens 102, the operator gets an enhanced view of the process. This aids the operator in both setup of the BAWS system and in monitoring the weld overlay process. The video display card works with the computer VGA card to provide video overlay to minimize computer CPU time and to provide a real time video window on the computer display. The video cards and software drivers that perform this function on PC computers are readily available from many commercial sources.

Operation of the Integrated System:

The BAWS integrated system applies weld overlay on boiler tubes in a cyclone boiler. To achieve this the integrated system is comprised of separate components designed to perform specific tasks. These task must be integrated to accomplish the overall function of applying the weld overlays. This integration is accomplished by the computer controller. The computer controller provides command and control of the process through software developed specifically for this purpose. The tasks performed by the separate components, the integrated function of these tasks, and the software design that provides command and control is discussed in the following section.

Four Axis Positioner:

FIG. 4 shows the isometric view of the four axis positioner in a cyclone boiler. The cyclone boiler is formed from 1" diameter steel tubes rolled into an approximate cylindrical shape. The end walls of the cylinder are formed from ⅞" diameter steel tubes shaped in conical sections that cap the cylindrical to form the boiler. The inside surface of the boiler is where the surface of the boiler tubes experience erosion. Access to the boiler is through an entrance at the coal injector end of the boiler shown in FIG. 1. The access is about 34" in diameter. This requires the four axis positioner to break into sections that can be loaded into the boiler through this access hole. This is accomplished by detaching the cross bar supports 42 from the rotary rail slide 38. The radial slide 39 detaches from the Z axis carriage 44. The shuttle slide 40 detaches from the radial slide 39. The break down of the four axis positioner into these subsections allows the device to be placed into the boiler. The four axis positioner is then reassembled in the boiler for operation. The electrical cabling on the four axis positioner is design to disassemble by cable connectors at each of the break down joints discussed above. The cable connections are reassembled in the boiler. The break down design of the four axis positioner has two advantages.

- The four axis positioner can be moved into and out of a cyclone boiler through the limited access hatch at the coal feed end of the boiler
- The subsections of the four axis positioner are small enough and light enough to be handed by two men in the boiler.

The design of the four axis positioner allows the computer to move shuttle slide 40 so as to reach any point in the cyclone boiler. This allows access to the entire surface of the boiler by a welding torch 41. The four axis positioner is the mechanical means for moving the welding torch about the walls of the cyclone boiler for the weld overlay operation. Computer software provides the motion commands that define and control the movements of the four axis positioner.

Tool Point Positioner:

The tool point positioner shown in FIG. 7 moves the welding torch 41 about a tool point 50 located a short distance from the end of the welding torch 41. This tool point concept allows the angle of the welding torch 41 to be changed relative to the plane of the work. If the weld pool 75 is located at the tool point 50 then the welding torch angle can be changed without moving the weld pool 50. If the tool point 50 is located at the center line of the boiler tube then successive passes of weld overlay can be deposited on a boiler tube by changing one of the gimbal axis. The same weld path programmed into the four axis positioner for that particular boiler tube is used for each of the weld passes.

The stepper motors that drive the gimbal A axis and gimbal B axis are controlled by the computer controller. The computer controller software allows either the operator or the program to control motion of these two axis.

Welding Torch, Welding Power Source:

FIG. 9 illustrates the welding torch 41 and the parts of the welding power source. The welding power source is controlled by the computer controller. Analog signals of 0–10 VDC are output from the computer controller to the welding power source. Two signals are provided. One 0–10 VDC signal controls the arc voltage setting of the welding power source. The other 0–10 VDC signal controls the wire speed setting of the welding power source. Both signals are generated by the computer controller under software control. The welding power source is turned on/off by a built in power contact relay. This relay is controlled by a digital output from the computer controller.

The welding parameters of arc voltage, arc current, and wire speed are monitored by the computer controller. The welding power source has 0–10 VDC analog outputs for this purpose. These analog outputs are wired to three analog to digital converters located in the computer controller. The conversion of these analog inputs are controlled by the computer controllers software. The constant voltage power supply is electrically connected to the commercially available welding wire feeder 72 by an electrical power cable 74. The welding wire feeder 72 feeds weld wire and arc voltage and current to the welding torch 41 through a welding power cable 74.

Tube Tracking System:

The tube tracking system is comprised of the components shown in FIG. 10. The laser distance gauge 92 is powered on when the BAWS system power is turned on. The gauge is then active. When the gauge is active it continuously returns voltage measurements which are proportional to the distance between the gauge and the surface at which the laser beam 93 is aimed. The voltage output signal from the laser distance gauge 92 is input to an analog to digital converter in the computer controller. The computer controller software determines when to make the analog to digital conversion. The balance of the time the input signal from the laser distance gauge 92 is ignored.

The computer controller has a stepper motor driver channel connected to the tube tracking stepper motor 95. The computer controller software actuates the tube tracking stepper motor 95 under software control. The motor is used to perform a linear scan over a boiler tube.

To perform a boiler tube scan the tube tracking system is located over a boiler tube by the four axis positioner under software control The tube tracking stepper motor 95 is actuated by the computer controller to move a linear distance. During the linear move the input from the laser distance gauge 92 is input to the computer controller. As the stepper motor is moved a small increment of about 0.01 inches the corresponding laser distance gauge 92 measurement is input through the analog to digital converter. This data is collected for the entire tube scan. The collected data forms a profile of the tube in terms of tube tracking stepper motor 95 position and laser distance gauge 95 measurements. This profile information is analyzed by the software to determine the location of the centerline of the boiler tube at the place of measurement. The coordinates of the four axis positioner at the location of the boiler tube centerline are determined. This information can then be used to determine a point along the weld path for the weld overlaying process.

Operator Vision System:

The operator vision system is illustrated in FIG. 11. The CCD camera system provides a video picture of the weld pool 75. This video image is displayed on the computers flat panel display for operator viewing. The hardware and software to window the video image onto the flat panel display is one of several commercially available systems. The CCD camera output is connected to a PCI video image card by a coax cable. The PCI video image card works with the computers VGA display card to overlay the video window onto the VGA display. The software provided with the video display system operates as a separate window in the Microsoft Windows operating system. This software is transparent to the software developed to operate the BAWS system.

Software Modules:

The software component for the BAWS was developed to run on Microsoft Windows 95 or Microsoft Windows NT. The programming language used for development is Microsoft Visual Basic. Data storage uses Microsoft Access database manager. However, there are several operating systems, programming languages, and database managers currently on the market which can be used to achieve equivalent software systems. Therefore the software structure and flow charts are presented in this disclosure. The structure and flow diagrams presented define the software system for the BAWS.

This information can be used to write equivalent software components in several programming languages operating on different operating systems.

The BAWS is operated by executing a sequence of instructions contained in tabular form called a weld schedule. This weld schedule is generated for each boiler tube to be repaired in the cyclone boiler. The software creates this schedule for each boiler tube prior to making the weld overlays on that tube. Once the weld overlay is complete on a boiler tube the weld schedule for that tube is stored to file and a new schedule is generated for the next boiler tube.

The each boiler tube's weld schedule consists of a database table. The database table used for the software component of the BAWS integrated system is shown in FIG. 12. The record values listed in FIG. 12 illustrate typical values for field items. The database contains the following fields:

| | |
|---|---|
| ID | A numerical index for each record |
| TIME | The time period for the record. |
| TRAVEL | Welding travel speed |
| ARC VOLTS | Arc voltage command to the welding system |
| WIRE SPEED | Wire speed command to the welding system |
| MOVE | Relative or absolute |
| ROTATION AXIS | Rotation axis move |
| RADIAL AXIS | Radial axis move |
| Z AXIS | Z axis move |
| Z1 AXIS | Z1 axis move |
| GIMBAL A AXIS | Gimbal A axis move |
| GIMBAL B AXIS | Gimbal B axis move |
| SHIELD GAS | On/Off |
| WELD CONTACTOR | On/Off |

The values contained in each field are in engineering units. Time is listed in seconds, travel speed is listed in inches/minute, arc volts is listed in volts, wire speed is listed in inches/minute, move is either relative or absolute, the axis of motion are in inches, the gimbal axis are in degrees, the shield gas and weld contactor are on/off.

When program control executes a weld schedule for a boiler tube each record in the schedule is executed sequentially starting with the lowest record ID and ending with the highest record ID. As a record is executed the fields in the record are executed in parallel. The results in all axis of motion and welding parameters operating simultaneously according to the values listed in the record under execution.

The duration of execution for a record is controlled by the interaction of the TIME and TRAVEL SPEED fields in a record. If a non zero value is listed in the TIME field then the other fields in that record are executed over the time duration listed in the TIME field. If the TIME field is zero then the TRAVEL SPEED field is used to calculate the time for the record. If there is a non-zero entry in the TRAVEL SPEED field then this value sets the speed at which the tip of the welding torch 41 travels. The distance of travel is the vector sum of the distances listed in the ROTATIONAL AXIS, RADIAL AXIS, Z AXIS, and Z1 AXIS fields. The TRAVEL SPEED value divided by this vector sum of distances determines the time duration for the record.

The remainder of the fields in the record are executed over the time duration for that record. The values entered into the ARC VOLTS and WIRE SPEED fields are maintained at that level for the time duration of the record. All the axis of motion are synchronized so that they start motion at the beginning of the record time duration and finish at the end of the record time duration. The SHIELD GAS and WELD CONTACTOR are turned on or off for the time duration of the record as specified by the value listed in each field.

The use of a weld schedule database has several advantages.

- A database can be filed and retrieved by standard software modules.
- A blank copy of the database is used for starting new weld schedule files.
- The weld schedule can be programmed and reviewed by standard database managers.

Two software modules operate on the weld schedule database. One of these modules is the weld schedule database programming module. This module performs the task of generating the weld schedule database table entries. The entries may be generated manually or by the tube tracking system. The other module is the weld schedule execution module. This module performs the execution of the data contained in the database. Each of these modules is discussed in the following.

Figure 13:
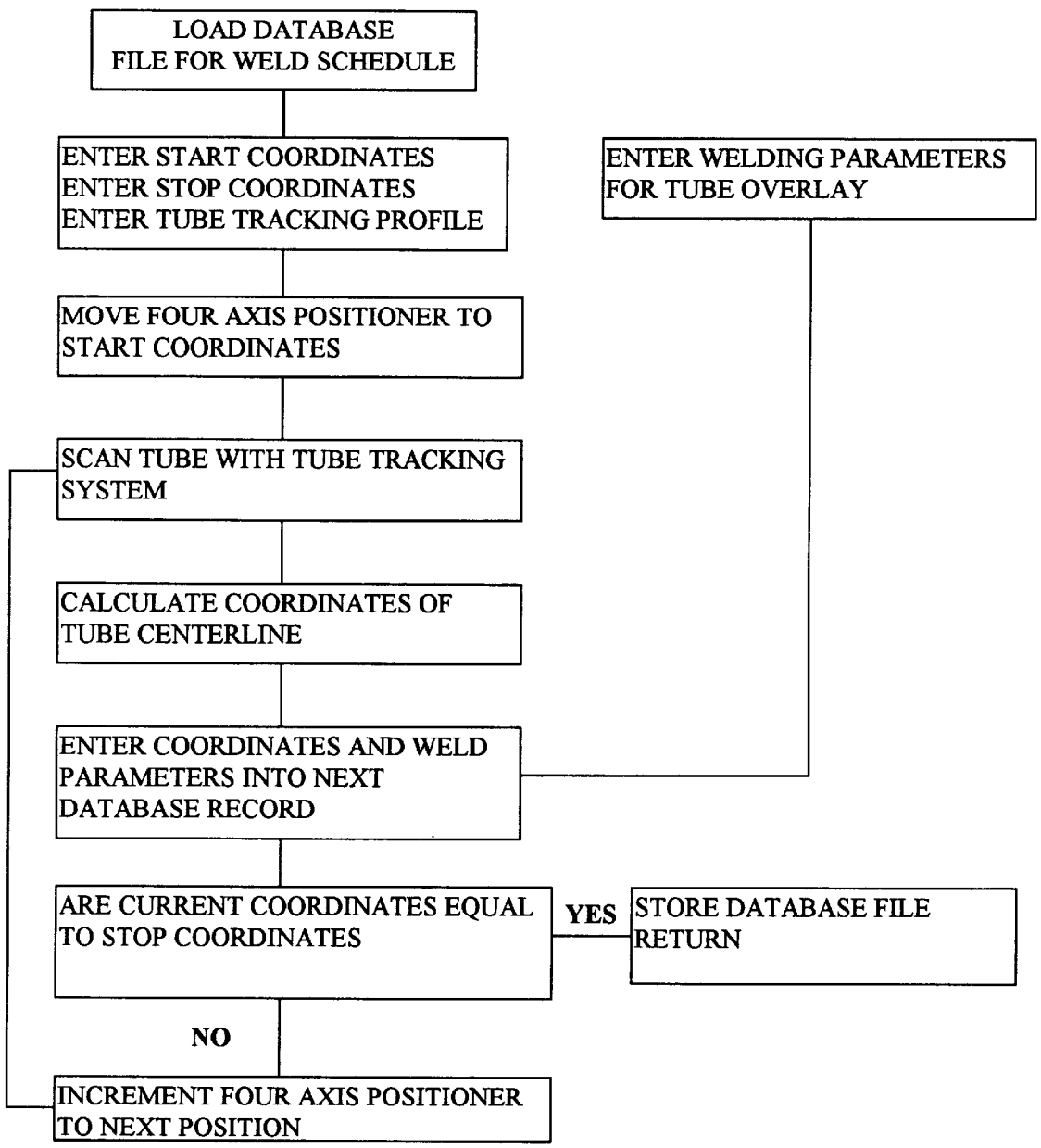
FIG. 13 is a flow chart of the weld schedule database programming software module.

Weld Schedule Database Programming Module:

FIG. 13 is a flow chart of the weld schedule database programming module for generating the database record entries with a tube tracking system. The manual entry is not included in this module. Manual entries can be generated using a standard database manager software.

The module retrieves a blank database file from the computer disk file. This database file is used to store entries to create a new weld schedule. The blank database file has the fields defined as shown in FIG. 12. When this file has been programmed with weld schedule records it will be saved under a different file name. This keeps the blank file in disk storage available for further use.

The starting and stopping coordinates for the four axis positioner are entered into the module. These coordinates define the starting and stopping points for the tube weld overlay in four axis positioner coordinates. The tube tracking profile is also selected. This profile is used by the tube tracking software module for controlling and interpreting the scan data from the tube tracking system. The welding parameters are input into the software module. These parameters remain active until changed by the operator.

The computer controller moves the four axis positioner to the starting coordinates. A tube scan is made by the tube tracking system. The centerline of the tube is calculated from the scan measurement. The calculated coordinate information and the welding parameter information are stored as a single record in the database file. The record used is the next sequential blank record in the file.

The current coordinate position of the four axis positioner is compared to the stopping coordinates. If the current coordinates equal or exceed the programmed stopping coordinates then the tube weld schedule programming process is complete. The program control returns to control back to the prior software module that called this module.

If the four axis fixture coordinates are less than the stopping coordinates then the current coordinates are incremented. The four axis positioner is moved to the new location. A new tube tracking scan is executed and the process loop above is repeated.

At completion of this software controlled loop a weld schedule has been generated for a single tube. The path of the motion system is defined down the centerline of the boiler tube between the starting and stopping positions defined at the beginning of the software loop. The welding parameters which include arc voltage, wire speed, and travel speed are also included in the weld schedule database for this boiler tube.

Figure 14:
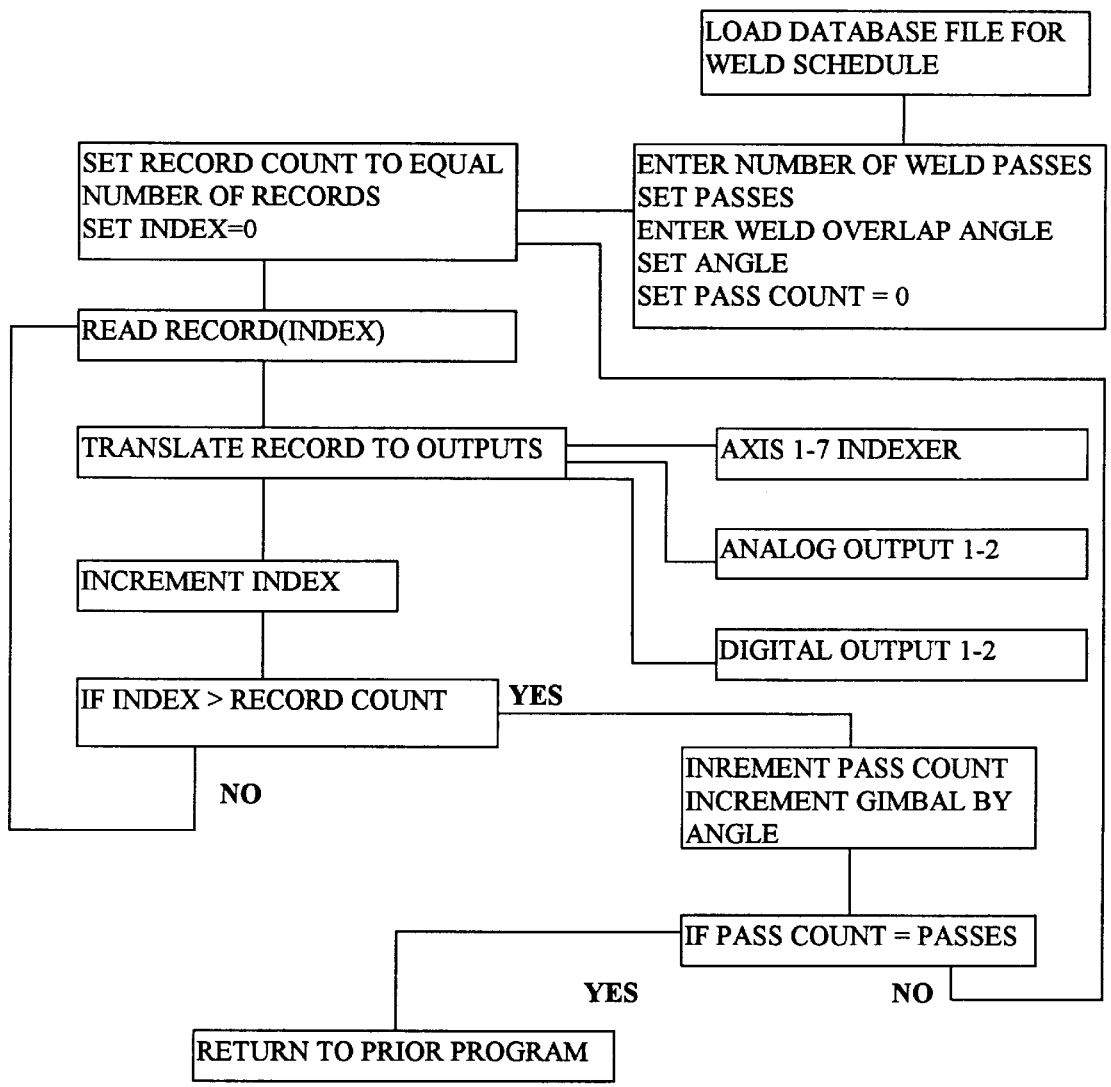
FIG. 14 is a flow chart of the weld schedule execution software module.
Figure 15:
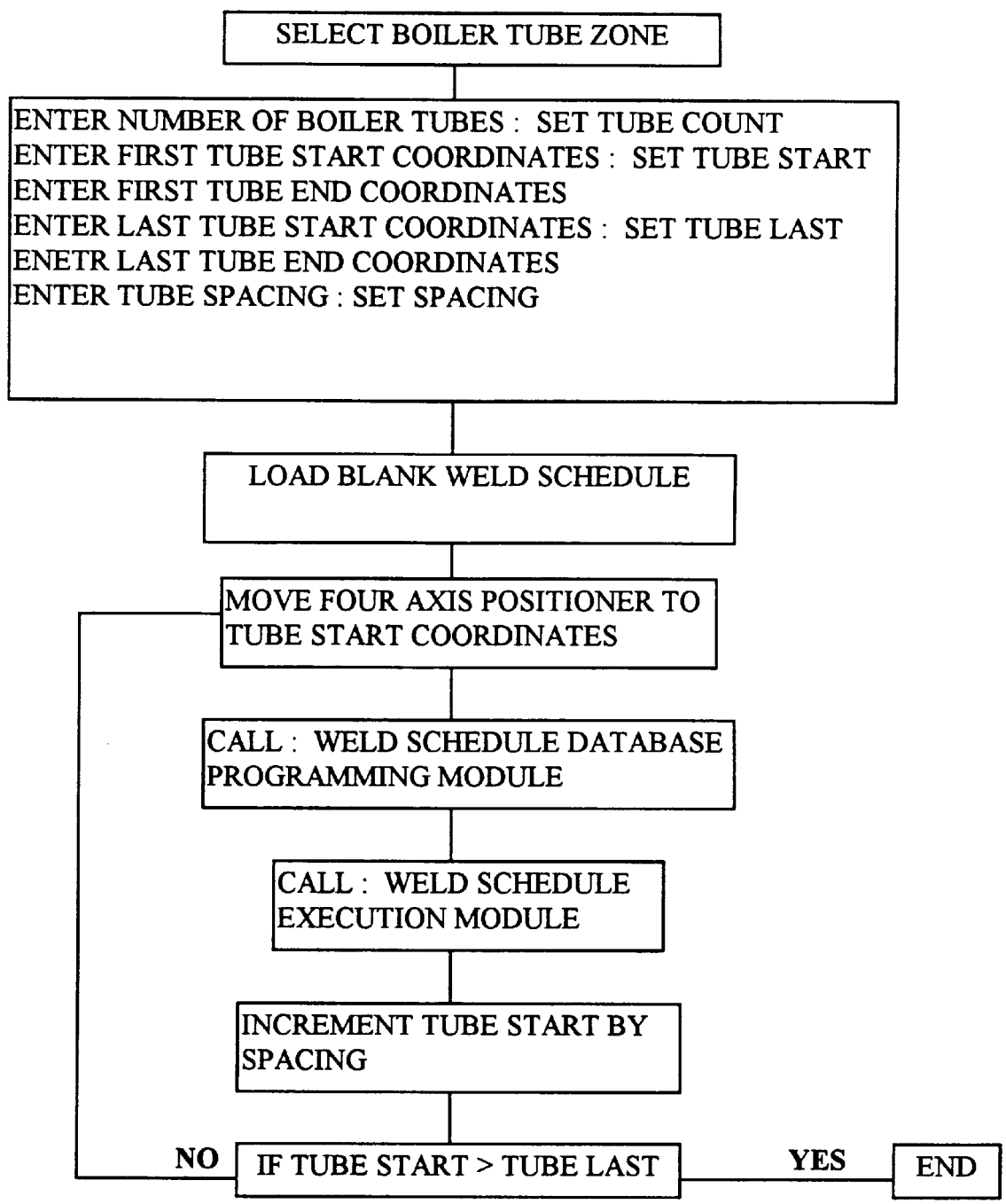
FIG. 15 is a flow chart of the program control software module.

Weld Schedule Execution Module:

FIG. 14 is a flow chart of the weld schedule execution module. This software module operates on the weld schedule database to cause the BAWS to perform the task specified in the database. The software module opens the weld schedule database. The operator enters the number of weld passes to be overlaid on the boiler tube and the overlap angle between weld passes. The overlap angle is the amount of angle change on one the gimbal axis on the tool point positioner. The change is made to the gimbal axis which is perpendicular to the centerline of the tube. This angular change is made between successive weld passes on the boiler tube. The result of the multiple weld passes is illustrated in the tube cross-section shown in FIG. 2.

The number of weld passes is recorded in variable passes. The angular change between weld passes is recorded in variable angle. The first weld pass is recorded as a zero in the variable pass count. The record count variable is set equal to the number of records in the database. An index counter is set to zero. The first record is read from the database file. The fields for that record are translated into command signals for the indexer cards and the analog to digital cards. These commands are executed by the indexer cards and analog to digital card using standard software programs supplied by the manufacture of these computer cards. The buffers in these cards signal the software translator when they are half empty. This signal queues the software to move to the next step in the flow chart. The index variable is incremented. The index variable is compared to the record count variable. If the index variable is greater than the record count variable then the weld schedule is finished. If the index variable is not greater than the record count variable then the next record is read from the file. The execution loop is repeated.

If the weld schedule execution loop is finished then the pass count is incremented. The gimbal angle is changed by the angle variable amount. The pass count variable is compared to the passes variable. If the pass count is less than passes the program returns to the point where the weld schedule execution is repeated. If the pass count variable is equal to the passes variable then the control returns to the calling program step. This completes the weld overlay on that boiler tube.

Program Control Module:

This module controls the overall operation of the BAWS. FIG. 14 shows the flow chart for the program control module. Several boiler tube configurations exist in a cyclone boiler. These different configurations are referred to as zones in the program control module. The boiler tube zone to be welded is selected by the operator.

The significance of selecting different boiler tube zones is its effect on the weld schedule database programming module. When the weld schedule database programming module is called the software in that module performs a tube scan and then increments the four axis of the four axis positioner to the next position. The incrementing method of the four axis varies by boiler tube zone. The incrementing method must be provided to the weld schedule database programming module. The software for the boiler tube zone selection process selects the proper incrementing method and passes this information to the weld schedule database programming module.

The operator enters the information for the number of tubes to be welded in the zone, the coordinate positions for starting and ending the weld on the first tube, the coordinate positions for starting and ending the weld on the last tube in the zone, and the tube spacing. This information is used to control the sequence of welding each boiler tube in the zone.

A blank weld schedule database table is loaded from the disk. This schedule is saved as a new schedule.

The four axis positioner is moved to the coordinates for the start of the weld on the first boiler tube in the zone. The weld schedule database programming module is called. The weld path for the first tube in the zone is programmed by that module. The weld schedule execution module is called. The weld overlays are applied to the boiler tube. The current starting position is incremented by the tube spacing value. This sets the starting coordinates on the next adjacent boiler tube. The new starting coordinates are compared to the last tube starting coordinates. If the new starting coordinates are greater than the last tube starting coordinates then the program is ended. If the new starting coordinates are not greater than the last tube starting coordinates then the weld path programming and tube weld overlay loop is repeated.

This method used for the boiler tube zone is repeated until all areas in the cyclone boiler have been repaired.

Conclusion:

The BAWS integrated system provides a automated system to resurface cyclone boiler tubes with weld overlay. The system performs automatically using a multiaxis robot positioner, a system to provide automatic tube tracking and a system that provides tool point position control.

While the above description contains many specificities, these should not be construed as limitations on the scope of the invention, but rather as an exemplification of one preferred embodiment thereof. Many other variations are possible. For example, the computer controller can be constructed from several different bus structured components such as the VME bus, the STD32 bus or the Microchannel bus.

The computer processor can use any commercially available processor that is current technology. The four axis positioner can be designed in other configurations. The rotary rotational axis can be incorporated into the Z axis carriage 44. A prototype device used this method of rotation. The radial axis motion can use an electrically operated cylinder instead of an elevator shaft motion. This was done on a prototype device. Z1 axis can also be an electrically operated cylinder instead of a shuttle device.

Accordingly, the scope of the invention should be determined not by the embodiments illustrated, but by the appended claims and their legal equivalents.

We claim:

1. An automated system for applying weld overlay to the eroded surface of boiler tubes in boiler wall panels, comprising:

a three axis means to form a cylindrical coordinate system comprising a rotational device having a rotational axis, a Z axis device having a Z axis, and a radial device having a radial axis;

a means for attaching said Z axis device to said rotation device so that said Z axis device is rotable about its Z axis;

a means for attaching said radial device to said Z axis device so that said radial device is movable along said Z axis and said radial axis is at a right angle to said Z axis;

a tool mount holding multiple tools attached to the end of said radial device so that said tool mount is movable by said radial device in a direction of said radial axis;

a torch gimbaling tool attached to said tool mount, wherein said torch gimbaling tool comprises: A torch mount, a first semicircular slide, a first slide carriage, a first slide mount, a second semicircular slide, a second slide carriage, a second slide mount, and a welding torch;

said torch mount attached to first slide carriage so that said welding torch is held parallel to the radius of said first semicircular slide;

said first semicircular slide attached to said first slide mount;

said first slide mount attached to said second slide carriage so that said welding torch is held parallel to the radius of said second semicircular slide so that said first semicircular slide and said second semicircular slide rotate said welding torch about a single point near the end of said welding torch; said second slide mount attached to said tool mount so that said welding torch is accessible to said boiler tubes;

a tube tracking system attached to said tool mount, wherein said tube tracking system is comprised of a laser distance gauge with a laser beam, a tube tracking slide with a tube tracking stepper motor oscillating said laser distance gauge;

said laser distance gauge attached to said tube tracking slide so that said laser beam is at a right angle to a direction of motion of said tube tracking slide;

said tube tracking system attached to said tool mount so that said laser beam accesses said boiler tubes;

means for supporting said three axis so that said Z axis device and said radial device are rotable about said Z axis by said rotation device;

means for driving said rotation device;

means for driving said Z axis device;

means for driving said radial device;

means for driving said semicircular slide;

means for driving said second semicircular slide;

means for driving said oscillating slide.

* * * * *